United States Patent
Del Rayo Hernandez Sanchez et al.

(10) Patent No.: US 12,446,606 B2
(45) Date of Patent: Oct. 21, 2025

(54) PROCESS FOR PREPARING POWDERS BY SPRAY DRYING AND POWDERS OBTAINABLE THEREBY

(71) Applicant: N.V. Nutricia, Zoetermeer (NL)

(72) Inventors: Maria Del Rayo Hernandez Sanchez, Utrecht (NL); Jordan Nicolaas Van Der Wel, Matamata (NZ)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 18/291,942

(22) PCT Filed: Jul. 28, 2022

(86) PCT No.: PCT/EP2022/071237
§ 371 (c)(1),
(2) Date: Jan. 25, 2024

(87) PCT Pub. No.: WO2023/006894
PCT Pub. Date: Feb. 2, 2023

(65) Prior Publication Data
US 2024/0268431 A1 Aug. 15, 2024

(30) Foreign Application Priority Data
Jul. 28, 2021 (EP) .................... 21188187

(51) Int. Cl.
| | | |
|---|---|---|
| A23L 33/115 | (2016.01) | |
| A23L 29/219 | (2016.01) | |
| A23L 33/00 | (2016.01) | |
| A23L 33/125 | (2016.01) | |
| A23L 33/175 | (2016.01) | |
| A23P 10/47 | (2016.01) | |
| A61K 31/202 | (2006.01) | |
| A61K 47/36 | (2006.01) | |
| A61K 47/44 | (2017.01) | |

(52) U.S. Cl.
CPC ........... *A23L 33/115* (2016.08); *A23L 29/219* (2016.08); *A23L 33/125* (2016.08); *A23L 33/175* (2016.08); *A23L 33/40* (2016.08); *A23P 10/47* (2016.08); *A61K 31/202* (2013.01); *A61K 47/36* (2013.01); *A61K 47/44* (2013.01)

(58) Field of Classification Search
None
See application file for complete search history.

(56) References Cited

U.S. PATENT DOCUMENTS

| | | | |
|---|---|---|---|
| 2008/0026105 A1* | 1/2008 | Khatib | .............. A23L 29/219 426/656 |
| 2021/0093578 A1* | 4/2021 | Wang | .............. A61K 9/1617 |

FOREIGN PATENT DOCUMENTS

| | | |
|---|---|---|
| AU | 2018259160 A1 | 10/2019 |
| CN | 105054001 A | 11/2015 |
| CN | 111657497 A | 9/2020 |
| JP | 2005008810 A | 1/2005 |
| RU | 2528026 C2 | 9/2014 |
| RU | 2748025 C2 | 5/2021 |

OTHER PUBLICATIONS

Domian Ewa et al: "Effect of oil content and drying method on bulk properties and stability of powdered emulsions with OSA starch and linseed oil", LWT—Food Science and Technology, vol. 88, Sep. 29, 2017 (Sep. 29, 2017), pp. 95-102, XP085257178, ISSN: 0023-6438, DOI: 10.1016/J.LWT.2017.09.043.

* cited by examiner

*Primary Examiner* — Jyoti Chawla
(74) *Attorney, Agent, or Firm* — Ipsilon USA—NLO

(57) ABSTRACT

The present invention relates to a use of octenylsuccinyl anhydride substituted starch (OSA starch) for increasing the dry weight content and/or the fat content of a liquid composition that is subjected to a spray-drying step, and also to a process for preparing powders. The present invention enables the spray-drying of emulsions that contain a high amount of fat. The present invention also relates to the powder products obtainable by the process and nutritional products such as an infant milk powder, grow up milk, toddler milk or as a medical nutritional product that can be formulated therewith.

15 Claims, 1 Drawing Sheet

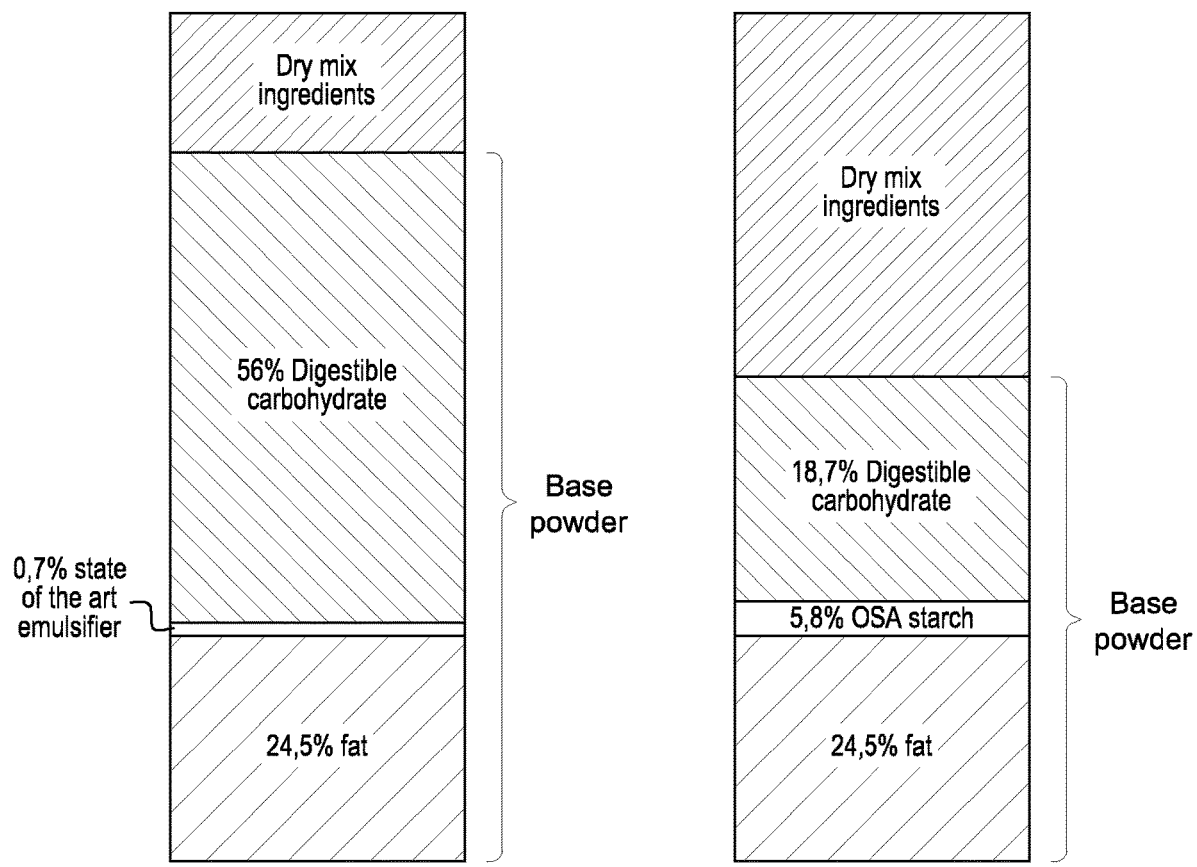

PROCESS FOR PREPARING POWDERS BY SPRAY DRYING AND POWDERS OBTAINABLE THEREBY

The present invention relates to a process for preparing powders that contain a high amount of fat by spray drying. The present invention also relates to the powder products obtainable by the process and nutritional products such as an infant milk powder, grow up milk, toddler milk or as a medical nutritional product that can be formulated with them.

BACKGROUND OF THE INVENTION

When preparing a powder in the spray drier it is economic to use solutions or emulsions that are as concentrated as possible in order to have as little liquid (water) as possible that needs to be removed in the spray drying process.

With aqueous compositions comprising fat in more than 30 wt % based on the weight of the composition the problem of increased free fat content becomes an issue that cannot be solved with the emulsifiers that are presently used. Therefore in the art the emulsions to be spray dried are standardly kept below 30 wt % fat.

In addition it is known that aqueous compositions that contain large amount of carbohydrates are difficult to handle in a spray dryer due to the tendency of the carbohydrates to cake, swell or increase viscosity of the composition, making it necessary to further dilute the raw materials.

It is to be understood that further diluting the streams to a spray dryer has a negative effect on production efficiency.

WO 2006079420 discloses a process to prepare milk-based carbohydrate-containing powders by spray drying. The nutritional powders are disclosed to be suitable as infant formulas, growing up milks, instant milk powders, functional milks or healthcare formulas. This document acknowledges the problems encountered when spray drying compositions that contain carbohydrates, such as starches, as these are susceptible of caking and swelling when in contact with water, and in many instances lead to very viscous liquids that a spray dryer cannot handle. Instead of further diluting the starting compositions this document solves these problems by adding the carbohydrate component as a dry ingredient to the turbulent zone of the spray dryer.

The use of OSA-starch in food technology is reviewed in "Synthesis and characterization of octenyl succinic anhydride modified starches for food applications. A review of recent literature" by L. Altuna, M. Herrera, and M. Foresti; Food Hydrocolloids 80 (2018) 97-110.

In the context of infant formula the application of octenylsuccinic anhydride-modified starch is prescribed in relevant standards (CODEX STAN 074-1981, REV. 1-2006) that confirm that the use thereof is allowed in food, also food for infants, up to a defined maximum amount.

US 2021093578 discloses a method for production of an encapsulated composition of phospholipid containing oils or lipids from a liquid emulsion comprising OSA starch as an emulsifier. The emulsions are then fed into a spray dryer.

JP200500881 discloses an unsaturated fatty acid containing oil/fat powder and the method for producing said powder by mixing an aqueous phase and a lipid phase, emulsifying the mixture and spray-drying the emulsion. The obtained powders can be used to make tablets for reconstitution or in bread or cookies.

CN111657497 discloses a method for the production of a fat powder suitable for a ketogenic diet. The method involves the preparation of an aqueous phase comprising OSA starch, combining the aqueous phase with a fat phase, homogenizing and then spray-drying.

A method for preparing a powder fat by spray-drying an emulsion comprising linseed oil, OSA starch (tapioca), trehalose and water is described in "Effect of oil content and drying method on bulk properties and stability of powdered emulsions with OSA starch and linseed oil" by E. Domian et al; Food Science and Technology 88 (2018) 95-102.

Not in these documents nor anywhere else in the literature it is suggested that OSA starch can be used for optimizing the spray drying capacity of high fat liquid compositions suitable for preparing food compositions like infant formulas, follow-on formulas and growing-up milks.

SUMMARY OF THE INVENTION

The inventors surprisingly found that the use of OSA-starch allows the spray drying of compositions with much higher dry weight content and with much higher fat content than is possible with other emulsifiers or starches (see FIG. 1). The inventors surprisingly found that when using OSA-starch as emulsifier, the free fat content of the spray dried powder remains below or equal to the limit of 3 wt % based on dry weight of the powder, even at very high fat content. Thus, the invention concerns the use OSA starch for increasing the dry weight content and/or the fat content of a liquid composition that is subjected to a spray-drying step. Using this surprising finding, the invention further provides a process to prepare powders with a free fat content of below 3 wt % using OSA starch as an emulsifier in the spray drying process.

The invention further provides a base powder comprising fat, carbohydrates and emulsifier, and that contains less than 3 wt % free fat.

Being able to produce a base powder with such high fat content provides more freedom to formulate nutritional powders. As all the fat content of the final product can go in a smaller amount of base powder, additional non-fat components can be dry mixed with the base powder. Such further non-fat components that can be suitably dry mixed with the base powder are several carbohydrates such as lactose, maltodextrin, biotics, amino acids, proteins, fibres, vitamins and minerals. As a further advantage the components that can be added by a dry mixing step do not have to undergo the steps of the present process, like the steps used in the formation of the (pre-)emulsion or the spray drying step. This means that less energy is needed on total nutritional powder and that the further components do not have to undergo any high pressure or high temperature conditions as used during the process, which can be disadvantageous for the several components and for the process.

For example, several biotics are susceptible for temperature and pressure conditions and may lose their activity. The same can happen with proteins that may denature. Amino acids have a tendency to aggregate under increased temperature and pressure and carbohydrates may start to cake. Fibres may undergo undesired fermentation processes. Accordingly, for the majority of the ingredients that are components in nutritional powders it is preferred to not have them undergo the conditions of a spray dry process.

When using this base-powder for preparing a nutritional powder additionally comprising free amino acids as protein source, the inventors surprisingly found that these nutritional powder based formulae had excellent properties such as a very good sensorial properties, such as in taste, and smell. Without being bound by theory the inventors believe that this may be caused by the use of the OSA starch and the base powder having such a low free fat content.

Therefore, the invention further pertains to nutritional compositions comprising fat, OSA-starch, digestible carbohydrates protein and/or amino acids, wherein the free fat content of the composition is below 3 wt % on dry powder weight.

Where quantities are specified in percentages, this means percentage by weight unless otherwise stated.

BRIEF DESCRIPTION OF THE FIGURE

FIG. 1 illustrates the advantages of the invention that allows the preparation of a base powder with a high fat content upon formulating a further nutritional product therefrom. Left column: Convention spray-drying process can handle about 30% fat (24.5 g fat in 81.2 g base powder=30.2%), over 80% of the total solids of the final powder has to be subjected to spray-drying and are thus included in the base powder. Thus, only 18.8% of the total solids weight can be dry-blended to the base powder in case the final powder should contain 24.5 wt % fat. Right column: Inventive spray-drying process can handle up to 50% fat (24.5 g fat in 49 g base powder=50%), so only 51% of the total solids of the final powder has to be subjected to spray-drying and are thus included in the base powder. Thus, up to 49% of the total solids weight can be dry-blended to the base powder in case the final powder should contain 24.5 wt % fat.

DETAILED DESCRIPTION OF THE INVENTION

The present invention first and foremost concerns the use of octenylsuccinyl anhydride substituted starch (OSA starch) for increasing the dry weight content and/or the fat content of a liquid composition that is subjected to a spray-drying step. In further aspects, the invention concerns a method for manufacturing a spray-dried powder containing OSA starch, the base powders and nutritional powders that can be obtained by said process and to the medical use of the nutritional powder. As will be appreciated by the skilled person, anything said for one of the aspects of the invention of course also applies to the other aspects of the invention. Before defining each of the aspects of the invention in more detail, the various features of the invention are defined in more detail, which is applicable to all aspects of the invention.

OSA Starch

The emulsifier in the present invention is an octenyl succinic anhydride substituted starch compound (herein also referred to as "OSA starch"). OSA starches are often available as a sodium salt. The OSA starch is preferably a food approved OSA starch (International Numbering System codex E1450). In an embodiment the OSA starch is derived from a waxy maize starch, tapioca starch, rice starch, potato starch, wheat starch, starch from other plant origin substituted with octenylsuccinic acid groups, such as other maize or other crops origin. Reference is made to "Structure and physicochemical properties of octenyl succinic anhydride modified starches: A review" by M. C. Sweedman et al, in Carbohydrate Polymers 92 (2013) 905-920 that discloses several OSA starches that may find use in the present invention. The use of an additional emulsifier in making the pre-emulsion and emulsion is not excluded by the present invention, but preferably only one or more OSA starch compounds are employed.

The amount of OSA starch is preferably in the range of 5 to 40 wt % on the total weight of fat in the emulsion, more preferably in the range of 7 to 20 wt %, most preferably in the range of 8 to 15 wt %.

Digestible Carbohydrate

The digestible carbohydrate in the present invention can be any carbohydrate that is known to the skilled person to be of use in nutritional powders. Examples are polysaccharides, oligosaccharides and monosaccharides, such as maltodextrin, glucose, lactose, dextrose, fructose, maltose, galactose or mixtures thereof. In a preferred embodiment, the digestible carbohydrate includes at least glucose and/or lactose, more preferably the digestible carbohydrate includes at least lactose. The digestible carbohydrate in the context of the present invention does not include the OSA starch compound, which is thus present in addition to the digestible carbohydrate component.

The amount of digestible carbohydrates in the base powder is preferably in the range of 10 to 65 wt % on total weight of dry base powder, more preferably in the range of 20 to 60 wt %. The amount of digestible carbohydrates is preferably in the range of 30 to 65 wt % on dry nutritional powder, more preferably in the range of 40 to 60 wt %.

The weight ratio of digestible carbohydrates to OSA starch in the nutritional powder is preferably in the range of 15/1-1/3, more preferably in the range of 10/1-1/1, even more preferably in the range of 7/1-2/1, most preferably in the range of 6/1-4/1. Such ratios of digestible carbohydrates to OSA starch are especially suited for the manufacture of infant formula products. In one embodiment, no digestible carbohydrates are added to the base powder, as well as no OSA starch. Hence, it is preferred that these values also apply to the base powder according to the invention.

Fat Ingredient

The fat ingredient is a liquid or molten ingredient containing at least one fat component. Naturally, the fat is preferably an edible fat or oil. Edible oils used in the context of the invention may be obtained from natural sources, for example plants, microbes and marine sources. Suitable plant sources include, but are not limited to, flaxseed, walnuts, sunflower seeds, canola oil, safflower oil, soy, wheat germ, leafy green plants such as kale, spinach and parsley, and corn oil. Suitable marine sources include, but are not limited to, crustaceans such as krill, molluscs such as oysters and fish such as salmon, trout, sardines, tuna, mackerel, sea bass, menhaden, herring, pilchards, kipper, eel or whitebait. Suitable microbe sources include algae and fungi. The edible oil may be present in a purified form and/or in the form of an extract from a suitable source. The fat ingredient may be a single fat component, but may also be a mixture of fat components, such as a mixture of edible oils from two or more sources. In one embodiment, the edible oil contains a fish oil.

In a preferred embodiment, the edible oil may be a mixture of oils from different sources, for example oil obtained from fish, oil obtained from plants and oil obtained from microbes, such as algae and fungi.

The fat in the fat ingredient in an embodiment can contain an unsaturated fatty acid such as one or more of docosahexaenoic acid (DHA), eicosapentaenoic acid (EPA), alpha-linoleic acid ALA, arachidonic acid (ARA), and oleic acid.

In a preferred embodiment, in the emulsion, and accordingly also in the obtained powders, the weight ratio of DHA to ARA is in the range of 5:1 to 1:5, more preferably in the range of 2:1 to 1:2.

In a preferred embodiment, part of the fat ingredient is a vegetable oil and thereby the fat ingredient contains considerable amounts of oleic acid, linoleic acid, and alpha linolenic acid. Preferably, the combined content of oleic acid, linoleic acid, and alpha linolenic acid is more than 1 wt % based on total fat content. In further preferred embodiments erucic acid is present. Even more preferred, linoleic acid and oleic acid are present in more than 5 wt % on total fatty acid content.

In another preferred embodiment at least part of the polyunsaturated (n-3 and n-6) fatty acids are derived from algae or vegetable oils. Even more preferably at least part of the DHA is from an algae oil source.

In another preferred embodiment part of the fat ingredient is a medium chain triglyceride or fatty acid, wherein medium chain means a fatty acid chain of 12 to 18 carbon atoms The fat ingredient may contain one or more additional components that are fat compatible (hydrophobic) like fat compatible vitamins, such as vitamins A, D, and E.

It is preferred that the at least one fat is present in encapsulated form in the spray dried powder, wherein the digestible carbohydrate and OSA starch form a coating layer around the fat globule. Coating means that the carbohydrate and OSA starch are on the surface of the fat globule, but does not imply that the coating layer must fully cover the fat globule surface. The OSA-starch serves as an emulsifier due to its amphiphilic nature. In this regard, the OSA-starch has a low viscosity profile for high concentration of fat in emulsions, such as for example 100-400 mPas at 70 deg C. at 1000 1/s and 100-600 mPas at 70 deg C. at 100 1/s. The low viscosity profile of OSA starch enables the spray drying of high concentration of fat. Another benefit of OSA-starch is that, there is an increase of the viscosity of the water phase in an emulsion, thereby reducing the mobility of fat droplets and reducing the occurrence of fat coalescence. This reduction in fat coalescence in the emulsion results in a spray dried powder with a lower free fat content.

The powders of the present invention are advantageously low in free fat content. In the context of the present invention, the free fat content is determined by the method described in "Determination of Free Fat on the Surface of Milk Powder Particles", Analytical Method for Dry Milk Products, NS NIRO ATOMIZER (1978). Typically, the samples were prepared in the following manner. First, the powder is finely ground with a cutter, to avoid grinding it down entirely (grinding step). Then, the ground powder was passed through a 32 mesh sieve (sieving step). The content of free fat in the samples was then measured by the method described in "Determination of Free Fat on the Surface of Milk Powder Particles", Analytical Method for Dry Milk Products, NS NIRO ATOMIZER (1978). The content of free fat determined by this method is represented by wt % of the fat extracted with carbon tetrachloride under shaking at constant rate within the prescribed time.

Further Components

Though it should be noted that in preferred embodiments many of the further components of the final powder are added after the spray drying step in a dry blending step, the pre-emulsion may contain additional components, such as those selected from the group of water compatible proteins, free amino acids, vitamins and minerals. In a preferred embodiment, the composition may contain milk proteins and/or amino acids, more preferably amino acids and/or vitamins. In a preferred embodiment, the pre-emulsion contains lipid-soluble further components, such as lipid-soluble vitamins.

Further components that may be present in the nutritional powder composition according to the invention include one or more of proteins, hydrolyzed proteins, peptides, amino acids, digestible carbohydrates, non-digestible carbohydrate (e.g. dietary fibres), biotics (one or more of probiotics, prebiotics and/or postbiotics, preferably at least probiotics and/or prebiotics), vitamins, minerals, flavours, or colorants. In a preferred embodiment, the further component includes at least amino acids.

Suitable examples of proteins are milk or plant derived proteins, preferably one or more from the group of whey or casein proteins, or vegetable proteins such as those derived from for example pea, soy, rice, beet, potato or grains. Optionally the proteins may be completely or partly hydrolysed. Mixtures of several proteins are also possible. Suitable examples of free amino acids are one or more natural amino acids, preferably one or more from the group of glutamine, glycine, alanine, arginine, aspartic acid, cysteine, histidine, isoleucine, leucine, lysine, methionine, phenylalanine, proline, serine, threonine, tryptophan, tyrosine, valine, all preferably in their naturally occurring L enantiomeric form, either in their acidic or salt form. In a preferred embodiment the amino acid mix contains several of the natural amino acids, e.g. at least two or at least three. The amount of total protein, protein hydrolysates and amino acid is preferably in the range of 10 wt % to 20 wt % on dry weight of the nutritional powder In a preferred embodiment at least some of the protein source is present in the form of a hydrolysed protein, oligopeptide of free amino acid component. Those are especially suited in case the nutritional product is intended to treat, prevent or reduce allergy. In an especially preferred embodiment, amino acids are the sole proteinaceous material present in the nutritional composition. Herein, sole means that 95-100 wt % on total proteinaceous material is amino acids, preferably at least 99 wt %, more preferably at least 99.9 wt %, most preferably 100 wt % is amino acids.

Suitable examples of vitamins include vitamins A, B, C, D and E. The present invention is compatible with lipid-soluble vitamins and water-soluble vitamins.

Suitable examples of dietary fibers include fructo-oligosaccharides (such as inulin), galacto-oligosaccharides (such as transgalacto-oligosaccharides or beta-galacto-oligisaccharides), gluco-oligosaccharides (such as gentio-, nigero- and cyclodextrin-oligosaccharides), arabino-oligosaccharides, mannanoligosaccharides, xylo-oligosaccharides, fuco-oligosaccharides, arabinogalacto-oligosaccharides, glucomanno-oligosaccharides, galactomanno-oligosaccharides, sialic acid oligosaccharides and uronic acid oligosaccharides. In a preferred embodiment, the nutritional composition does not contain xanthan gum, preferably no gums or hydrocolloids other than OSA starch.

Thus, the present invention concerns the use of octenylsuccinyl anhydride substituted starch (OSA starch) for increasing the dry weight content and/or the fat content of a liquid composition that is subjected to a spray-drying step. Preferably, the use is at least for increasing the fat content of the liquid composition. The increased fat content has subsequent effects which are beneficial for the manufacturing method and the spray-dried powders obtained thereby. Thus, in a preferred embodiment, the use according to the invention is further for one or more of:

reducing the free fat content in the spray-dried powder;
reducing the formation of advanced glycation end-products and lysine blockage in the spray-dried powder;
improving the sensorial properties of the spray-dried powder;
increasing the amount of components that can be dry-blended with the spray-dried powder;

reducing the spray-drying temperature;
reducing the energy cost of the spray-drying step;
reducing the fouling of the spray-dryer;
reducing the overall heat load that is experienced by the spray-dried powder during manufacturing thereof.

Most preferably, the use is for at least two, at least three, at least four, at least five, at least six, at least seven or even all eight of the aforementioned effects. All of these effects provide benefit to the spray-drying process as well as the products obtained thereby.

These advantages are especially pronounced in the manufacture of infant formulas. Infant formulas contain a predefined fat content, from which no deviation is possible. The fat ingredients should be present in the liquid phase to be homogenised before the liquid emulsion is fed to a spray-drier. Increasing the total dry-weight content and the fat content of the emulsion that may be added to the spray-drier creates a greater flexibility in the formulation of the infant formula product. As such, dry ingredients such as dietary fibers and amino acids can be dosed at will upstream or downstream of the spray-drier. These components do not need to be present in the liquid emulsion for heat treatment or homogenisation, and can now be dry-blended with the spray-dried powder, which increases process efficiency and reduces costs of the manufacturing process.

These advantages are also applicable to other compositions which have a pre-defined fat content, such as certain medical nutritional formulas.

Method

The method according to the invention is for producing a powder comprising fat, an emulsifier and digestible carbohydrates. The method comprises:

a. preparing a liquid containing the digestible carbohydrate and the emulsifier in water by adding the digestible carbohydrate and the emulsifier consecutively or simultaneously to water at a temperature of between 50 and 90 deg C., optionally using a homogenization step;
b. providing a fat ingredient containing at least one fat;
c. combining the liquid and the fat ingredient to provide a pre-emulsion;
d. performing a homogenization step to homogenize the pre-emulsion to form an emulsion, and optionally increasing the dry matter content of the emulsion by a concentration step;
e. spray drying the emulsion obtained in step d to provide a powder;
f. optionally further drying the powder of step e.

Herein, the emulsifier is octenylsuccinyl anhydride substituted starch (OSA starch).

Steps (a)-(c): Preparing Pre-Emulsion

The OSA starch emulsifier can be dissolved in warm water, preferably water that is 50-80 deg C., followed by the addition of the further components that are water compatible, such as the digestible carbohydrates, like sugars or maltodextrins and optionally proteinaceous material such as proteins, peptide or free amino acids. In one embodiment, at least free amino acids are added to the aqueous phase at this moment.

If the fat ingredient contains more than a single fat, the different fats are preferably first blended at a relatively low temperature to reduce oxidation, preferably below 40 deg C. In a subsequent step, the blended fat ingredient is added to the solution containing OSA starch and the further components such as the digestible carbohydrates to provide a pre-emulsion. The temperature of the pre-emulsion preferably remains at 50-80 deg C., which is the standard compounding temperature for the production of infant formula, and furthermore it is preferred to continue to agitate the pre-emulsion in order to reduce the risk of fat coalescence.

The OSA starch-containing liquid and fat are preferably combined in a weight ratio in the range of 0.5 to 10, preferably in the range of 2 to 5, to give the pre-emulsion.

Step (d)—Homogenisation

The liquid pre-emulsion after the fat and the solution containing the OSA starch and other components have been combined, is homogenised, in one or more stages, preferably in two stages. If it is desired, for example to further increase the solids content prior to spray-drying, the (pre-)emulsion can be concentrated, for example to reach a solids content of 50% or more by initially compounding at higher solid or by evaporation. Solids are defined to comprise anything but water.

The homogenization step preferably comprises increasing the pressure, preferably to a pressure in the range 100 to 400 bar, more preferably in the range of 150 to 250 bar. Homogenization can also be performed by employing mechanical stress, such as stirring, mixing or kneading. The emulsion in further embodiments may be subject to a heat treatment, for example by heating it to a temperature of between 50 and 100 deg C., preferably 70-95 deg C. Heat treatment, mechanical and pressure treatment steps may be optionally combined in one step or two or more of these steps may be performed consecutively. These steps are well-known in the field of nutritional composition manufacture. The duration of any homogenization step is known to the skilled person, but is preferably as short as possible to preserve the quality of the components and for process efficiency and energy cost reasons. In preferred embodiments homogenization steps are performed for up to 15 minutes, preferably up to 2 minutes. The heat treatment is primarily done for reducing the microbial load in the product prepared but may in addition result in better homogenization.

In an embodiment the emulsion containing the OSA starch, fat ingredients and optional further components such as digestible carbohydrates has a solids content above about 20 wt %; for example in the range of 30 to 60 wt %, preferably in the range of 35 to 55 wt %.

Step (e)—Spray Drying Process

The homogenised and optionally concentrated liquid emulsion is then spray-dried. Spray-drying is a well-known process in the manufacturing of powders, and it may be accomplished in any way known in the art. This may be carried out by spraying the liquid concentrate into the top of a spray-drier, preferably with high pressure swirl nozzles. The atomisation pressure is typically in the range of 50 to 300 bar, preferably in the range of 60 to 120 bar with the hot air being introduced at a temperature in the range of 100 to 400 deg C., preferably in the range of 180 to 200 deg C. The emulsion preferably has a temperature higher than 20 deg C. and below 95 deg C., even more preferably in the range of 50 to 90 deg C. Suitable spray-driers and spray-drying conditions are well known to the skilled person.

Optionally, a further drying step (f) can be performed, like leading the powder over an external fluidized bed, freeze drying it, drying it in open air, on a belt or in an oven, preferably at relatively mild conditions such as temperatures not exceeding 40 deg C.

The powder obtained after the spray-drying and optional further drying step is typically referred to as a base powder, and can be used to prepare a final nutritional product, such as an infant formula. The base powder typically has a fat content is at least 32 wt %, preferably in the range of 35 to 70 wt %, more preferably in the range of 40 to 60 wt % based on total weight of the base powder, and less than 3 wt % free fat. In one embodiment, the final nutritional powder has a fat content of at most 70 wt %, more preferably at most 60 wt % based on total weight of the base powder.

In case further components are added in a (dry) blending step, the fat content of the final nutritional product may be a bit lower, such as at least 16 wt %, preferably in the range of 18 to 40 wt %, more preferably in the range of 20 to 35 wt % based on total weight of the nutritional powder. The free fat content of less than 3 wt % free fat also applies to the final nutritional powder, irrespective of any (dry) blending step. In an alternative embodiment, the final nutritional powder has a fat content of at least 32 wt %, preferably in the range of 35 to 70 wt %, more preferably in the range of 40 to 60 wt % based on total weight of the base powder, and less than 3 wt % free fat. In one embodiment, the nutritional composition is defined as comprising a base powder having a fat content is at least 32 wt %, preferably in the range of 35 to 70 wt %, more preferably in the range of 40 to 60 wt % based on total weight of the base powder.

The process according to the invention may further contain a step to produce a final nutritional powder composition from the spray-dried and optionally further dried powder of step (e) or (f). The final product may be selected from infant formulas, follow-on formulas, growing up milks, instant milk powders, functional milks, healthcare formulas, medical food product and the like. Preferably, the final product is an infant formula, follow-on formula, growing up milk or medical food product. In a preferred embodiment, the final nutritional product is an infant formula, follow-on formula or growing up milk, preferably an infant formula or growing up milk, most preferably an infant formula.

In a preferred embodiment, the step of producing the final nutritional composition involves the dry-blending of one or more components such as digestible carbohydrate, a digestible protein, a hydrolysed protein, a peptide, an amino acid, a biotic, a non-digestible carbohydrate or fibre, a vitamin, mineral or a mixture of two or more of these. It is especially preferred that the dry-blending is at least with free amino acids.

In one preferred embodiment, the final nutritional product is an infant formula, follow-on formula or growing up milk and the dry blending step includes at least the dry blending of amino acids, and wherein amino acids are the sole proteinaceous material in the final nutritional product. In an alternative preferred embodiment, the final nutritional product is a medical food product and the dry blending step includes at least the dry blending of amino acids, and wherein amino acids are the sole proteinaceous material in the final nutritional product.

The Base Powders and Nutritional Powders Obtainable by the Invention

The invention further concerns a base powder comprising, fat, digestible carbohydrates and emulsifier, wherein the fat content is at least 32 wt % based on total dry weight of the base powder, the free fat content is less than 3 wt % based on total weight of the fat, and the emulsifier is OSA starch. Such a base powder is typically obtainable by the process according to the invention.

The invention further concerns a nutritional powder comprising a base powder according to the invention, and one or more ingredients selected from the group consisting of a digestible carbohydrate, a protein, hydrolysed protein, peptide, amino acid, a non-digestible carbohydrate, biotic, vitamin and mineral. Such a nutritional powder is typically obtainable by the process according to the invention.

The base powders and nutritional powders obtained from the spray-drier in the process according to the invention have very good properties. In particular, the powders have good wettability and solubility properties. Further, the powders are homogeneous and tend not to settle out into different components during storage and transportation. Also, the spray-drier is subjected to significantly less fouling. In the case of milk protein-containing or amino acid-containing powders in particular, the formation of advanced glycation end products and lysine blockage will be reduced because the process of the present invention enables the rate of the spray drying process to be increased because of the reduction in fouling. This means that the temperature in the spray dryer is lower for a given temperature of hot air introduced into the dryer because there is a greater total mass of liquid present. By this means, the operating temperature in the dryer may be 10 deg C. or more below those encountered in conventional processes with a resulting decrease in lysine blockage in the case of milk based powders such as infant formulas.

As the fat content in the base powder is high, the final nutritional powder formulated with the base powder may contain higher amounts of further components that are added in a dry mix step following the spray dry process of the invention, and still contain sufficient fat. In embodiments the base powder is present in the final nutritional powder in an amount of between 30 and 70 wt %, preferably between 40 and 60 wt % of the final formulation, while when having a lower fat content the base powder usually constitutes between 72 and 95 wt % of the final nutritional powder, leaving significantly less room for adding further dry ingredients.

The OSA starch containing nutritional powders which may be produced by the process according to the invention are any suitable powders, such as infant formulas, follow-on formulas, growing up milks, instant milk powders, functional milks, healthcare formulas, medical food products and the like. The powders may be milk-based powders which contain milk ingredients but may also contain vegetable ingredients such as they can be derived from soy, rice, pea, or other vegetables. Preferred nutritional powders obtainable by the present invention are powders containing at least 20 wt % of fat on total weight, preferably at least 22 wt % even more preferably at least 24 wt %.

The invention concerns base powders for these final products, which may need supplementation of further components, e.g. by dry mixing. However, preferably the powders according to the invention are already formulated in their final form, in which case the process according to the invention optionally includes a (dry) blending step downstream of the spray-drying step, as known in the art.

Thus, in a preferred embodiment, the nutritional powder according to the invention is selected from the group consisting of infant formulas, follow-on formulas, growing up milks, instant milk powders, functional milks, healthcare formulas and the like. In an especially preferred embodiment, the nutritional powder according to the invention is an infant formula, follow-on formula or growing up milk, more preferably an infant formula or growing up milk, most preferably an infant formula. Infant formulas, follow-on formulas and growing-up milks are nutritional powders intended for reconstitution in a liquid to provide a ready-to-feed liquid nutritional product. Herein, infant formula are typically intended for infants of 0-12 months of age, preferably 0-6 months of age. Follow-on formula are typically intended for 6-12 months of age. Growing-up milks are intended for 12-36 months of age. The terms infant formula, follow-on formula and growing up milk also include special formulas for a specific target group, such as infant foods for special medical purposes. This included infant food for infants suffering from cow's milk allergy. In a preferred embodiment, the nutritional composition according to the invention is an infant food for special medical purposes, most preferably for infants suffering from cow's milk allergy.

Further Components

The products according to the invention may contain one or more further components that can be added to the emulsion entering the spray dryer, separately to the spray dryer and/or to the spray dried base powder by a (dry) blending step. The further components may be one or more of proteins, hydrolyzed proteins, peptides, amino acids, digestible carbohydrates, non-digestible carbohydrate (e.g. dietary fibres), biotics (one or more of probiotics, prebiotics and/or postbiotics, preferably at least probiotics and/or prebiotics), vitamins, minerals, flavours, or colorants. In a preferred embodiment, the further component includes at least amino acids.

In an embodiment the further components can already be present in the base powder and thereby in the nutritional powders. In another embodiment, the nutritional powders of the invention are prepared starting from the spray dried base powders as obtainable in the process of the invention to which one or more dry ingredients are added by a (dry) blending step. Further dry ingredients contain at least one of a digestible carbohydrate, a digestible protein, a hydrolysed protein, a peptide, an amino acid, a biotic, a non-digestible carbohydrate or fibre, a vitamin, mineral or a mixture of two or more of these. Especially free amino acids are preferably added in a dry blending step.

Components that are suitably added by a (dry) blending step are one or more of a digestible carbohydrate, a digestible protein or a natural amino acid, fiber, vitamin, mineral, encapsulated fat (e.g. DHA or ARA) or a mixture of two or more of these fats.

Suitable examples of proteins that beneficially can be added to either the (pre) emulsion and/or preferably to the base powder are milk or plant derived proteins, preferably one or more from the group of whey or casein proteins, or vegetable proteins such as those derived from for example pea, soy, rice, beet, potato or grains. Optionally the proteins may be completely or partly hydrolysed. Mixtures of several proteins are also possible.

Suitable examples of free amino acids that beneficially can be added to either the (pre) emulsion and/or preferably to the base powder are one or more natural amino acids, preferably one or more from the group of glutamine, glycine, alanine, arginine, aspartic acid, cysteine, histidine, isoleucine, leucine, lysine, methionine, phenylalanine, proline, serine, threonine, tryptophan, tyrosine, valine, all preferably in their naturally occurring L enantiomeric form, either in their acidic or salt form. In a preferred embodiment the amino acid mix contains several of the natural amino acids, e.g. at least two or at least three.

In case the protein source has poor agglomeration properties and is thereby less suitable to spray dry, such as protein hydrolysates and free amino acids, it is preferred that those are added in a dry blending step to the base powder. The present invention enables such increased dry-blending of components, since an emulsion with higher fat content can be subjected to the spray-dryer.

The amount of total protein, protein hydrolysates and amino acid is preferably in the range of 10 wt % to 20 wt % on dry weight of the nutritional powder In a preferred embodiment at least some of the protein source is present in the form of a hydrolysed protein, oligopeptide or free amino acid component. Those are especially suited in case the nutritional product is intended to treat, prevent or reduce allergy.

In a preferred embodiment the vitamins that are more fat compatible, such as vitamins A, D and E, are added to the spray dryer in the process to prepare the base powder. In another preferred embodiment the vitamins, such as vitamins B and C that are more water compatible are added to the base powder in a dry blending step.

Fibres can also be included in the base powder or nutritional powder of the invention. In a preferred embodiment fibres are added to the base powder in a (dry) blending step as fibres are susceptible to fermentation which can be as much as possible avoided if they do not undergo spray drying conditions.

Prebiotics and postbiotics can also be included in the base powder or nutritional powder of the invention. In a preferred embodiment, prebiotics and postbiotics are added to the base powder in a (dry) blending step as subjecting them to spray drying conditions may deteriorate their activity.

In an especially preferred embodiment, the dry ingredients blended with the base powder contain at least a carbohydrate compound, even more preferably a carbohydrate compound and either or both a protein and amino acid component.

Nutritional Powders Applications

The nutritional powders of the present invention are of use as infant formula or medical nutrition formula or in the preparation of any of such formulae. Thus, in a preferred embodiment, the nutritional powder according to the invention is selected from the group consisting of infant formulas, follow-on formulas, growing up milks, instant milk powders, functional milks, healthcare formulas and the like. In an especially preferred embodiment, the nutritional powder according to the invention is an infant formula, follow-on formula or growing up milk, more preferably an infant formula or growing up milk, most preferably an infant formula. Herein, infant formula are typically intended for infants of 0-12 months of age, preferably 0-6 months of age.

The use of OSA starch is especially well compatible with nutritional compositions comprising amino acids as protein. Therefore, in an especially preferred embodiment, the composition is protein-free, which optionally comprises amino acids but no larger peptides or intact proteins. Thus, in a preferred embodiment, the nutritional powder according to the invention is a protein-free infant formula, follow-on formula or growing up milk, more preferably a protein-free infant formula or growing up milk, most preferably a protein-free infant formula.

The infant formula or medical nutrition formula is especially suitable for use in treating, reducing and/or preventing allergy or metabolic diseases or disorders. For example, Cow's milk Allergy (CMA), is an adverse immune reaction to one or more of cow's milk proteins and the symptoms may be rapidly or gradual, which may lead to anaphylaxis, atopic dermatitis and enteropathy. In order to improve the life quality of babies and infants suffering from CMA, an amino acid base formula product which is a protein-free formula that contains all the fatty acids, amino-acids and minerals that infants need for his growth and develop, was developed. These amino acid-based infant formulae are suitable for the dietary management of infants with severe CMA, not effectively managed by an extensively hydrolysed formula. In one embodiment the use is a therapeutic use. In another embodiment the use is a non-therapeutic use.

EXAMPLES

The invention is illustrated in the following examples.

Example 1

Emulsion Preparation (Samples A to G)

100 kg of emulsion at 60% dry matter was prepared as follows: 40 kg of water was heated up at 70 deg C. Then waxy maize OSA starch in the amount as indicated in Table 1 was dissolved at low share rate to avoid foaming. After complete dissolution of the emulsifier, glucose syrup DE 21 in the amount as indicated in Table 1 was added to the solution. In a different tank, the vegetable fats (sunflower oil, rape seed oil and MCT oil) and fat soluble vitamin E were blended at temperature below 40 deg C. in a weight ratio of 2:2:1. The obtained fat blend in the amount as indicated in below Table 1 (<40 deg C.) was then added to the tank at 70 deg C. containing the aqueous solution with OSA starch, glycose syrup and ascorbic acid (vitamin C) to produce the pre-emulsion. The temperature of the pre-emulsion was 60-65 deg C. The pre-emulsion was agitated at higher speed.

TABLE 1

Feed composition used in Example 1 (in grams)

| Feed | A | B | C | D | E | F | G |
|---|---|---|---|---|---|---|---|
| Fat | 320 | 420 | 500 | 550 | 600 | 650 | 700 |
| OSA-starch | 75 | 98 | 116 | 128 | 140 | 152 | 163 |
| Glucose syrup DE 21 | 605 | 482 | 383 | 322 | 269 | 198 | 137 |

The pre-emulsion was subjected to a downstream homogenization step at about 150/50 bar (1st stage pressure drop/2nd stage pressure drop) and single pass. The pre-heating temperature was 70 deg C., pasteurization temperature was 90 deg C. with 30-40 seconds holding time (indirect heat treatment in a plate heat exchanger) and feed flow of 100 L/h. In addition, after heat treatment, a nitrogen blanket on the vessel surface was applied using liquid nitrogen to prevent fat oxidation. The emulsion remained in the tank under agitation until spray drying.

Spray Drying Process

The emulsion was pumped from the tank to the top of the multistage spray dryer using a homogenizer pump at 50 bar. The drying conditions are: Inlet air temperature 190 deg C., outlet air temperature at a range of 90-94 deg C. and the feed temperature was 70 deg C. High pressure nozzles were used. The pressure of the atomization ranged from 60 to 85 bar with a feed flow of 60-70 L/h.

The spray dried powders were analysed in terms of total fat content to be of composition as listed in Table 2.

TABLE 2

Composition of the powders as prepared (in wt % on dry weight)

| Ingredient | A | B | C | D | E | F | G |
|---|---|---|---|---|---|---|---|
| Fat | 32 | 42 | 50 | 55 | 60 | 65 | 70 |
| OSA-starch | 7.5 | 9.8 | 11.6 | 12.8 | 14 | 15.2 | 16.3 |
| Glucose syrup DE 21 | 60.5 | 48.2 | 38.4 | 32.2 | 26 | 19.8 | 13.7 |

Example 2: Preparation of Nutritional Powder Compositions

Using the powders prepared in Example 1 (samples A to D), nutritional powders were prepared by dry blending further components thereto. In this Example 2, a dry blend of a fixed amount of an amino acids mixture and minerals mixture was used and as remaining dry component glucose was used. The fat content in the final nutritional powder was set to about 24 wt % on total nutritional powder, and the amount of base powder used was adjusted based on the fat content thereof.

The mixture that was dry-blended with the powders of Example 1 contained 64 wt % amino acids, 26 wt % minerals and 10 wt % glucose syrup. The amino acids in the mixture have the following composition: 3.9 wt % of L-alanine, 7.0 wt % of L-arginine, 6.5 wt % of L-aspartic acid/asparagine, 2.7 wt % of L-cyst(e)ine, 8.8 wt % of L-glutamine, 6.2 wt % of L-glycine, 3.9 wt % of L-histidine, 6.2 wt % of L-isoleucine, 10.5 wt % of L-leucine, 7.1 wt % of L-lysine, 1.7 wt % of L-methionine, 4.7 wt % of L-phenylalanine, 7.5 wt % of L-proline, 4.6 wt % of L-serine, 5.2 wt % of L-threonine, 2.1 wt % of L-tryptophan, 4.7 wt % of L-tyrosine, and 6.7 wt % of L-valine.

TABLE 3 nutritional compositions (in wt % based on dry weight) made from high fat base powders of Example 1

| Ingredient | 32% fat in BP of Ex 1A | 42% fat in BP of Ex 1B | 50% fat in BP of Ex 1C | 55% fat in BP of Ex 1D |
|---|---|---|---|---|
| Base powder | 75 | 57 | 48 | 44 |
| amino acid and mineral mixture | 25 | 25 | 25 | 25 |
| Further dry component (digestible carbohydrate) | 0 | 18 | 27 | 31 |

When the base powder contains a higher amount of fat, higher amounts of components can be added in a dry blending step, which leaves more freedom in formulating the final composition. Also, it is possible to add digestible carbohydrate and amino acid components in a dry blending step and still obtain the same formulation, which is an advantage as such compounds can be troublesome to handle in a spray drying step. Furthermore, it is possible to dose more of dry nutrients in the dry blending step compared to conventional processes.

Formulation B was found to be most suited for the manufacture of infant formula products such as infant formulas, follow-on formulas and growing-up milks.

Example 3: Milk Powder with Amino Acid

Step 1: High Fat Base Powder (42% Fat) with OSA-Starch by Spray Drying of 200 kg Emulsion at 60% Dry Matter 80 kg of water was heated to 70 deg C. Then, 11.67 kg of waxy maize OSA starch was dissolved in the heated water at low share rate to avoid foam formation. After complete dissolution of the OSA starch, 57.84 kg of glucose syrup DE 21 was added to the previous solution. Ascorbic acid (Vitamin C) was added to the aqueous solution Then, 50.4 kg of fat or fat blend (with or without Vitamin E), which was previously blended (<40 deg C.) was added to the aqueous solution of OSA starch and glycose syrup (70 deg C.) to produce the pre-emulsion. The temperature of the pre-emulsion was kept at 60-65 deg C. The pre-emulsion was agitated at higher speed.

The pre-emulsion was subjected to a downstream homogenization at about 150/50 bar (1st stage pressure drop/2nd stage pressure drop) and single pass. The pre-heating temperature was 70 deg C., pasteurization temperature was 90 deg C. with 30-40 seconds holding time (indirect heat treatment in a plate heat exchanger) and feed flow of 100 L/h. In addition, after heat treatment, a nitrogen blanket on the vessel surface was applied using liquid nitrogen to prevent fat oxidation.

The emulsion was pumped from the tank to the top of the multistage spray dryer using a homogenizer pump at 50 bar. The drying conditions were: Inlet air temperature 190 deg C., outlet air temperature at 90-94 deg C. and the feed temperature was 70 deg C. High pressure nozzles were used. The pressure of the atomization ranged from 60 to 85 bar with a feed flow of 60-70 L/h.

Step 2: Dry Blending of 100 kg Powder.

57.46 kg of high fat base powder (42% fat) was dry blended with 17.96 kg of glucose syrup DE 21 and 16 kg of the free amino acids mixture (same as for Example 1), and around 5 kg of a mixture of minerals (Sodium, Potassium, Chloride, Calcium, Phosphorus, Phosphate, Magnesium, Iron, Zinc, Copper, Manganese, Fluoride, Molybdenum, Selenium, Chromium and Iodine) and vitamins (Vitamin A, Vitamin D3, Vitamin K, Thiamin (B1), Riboflavin (B2), Niacin (B3), Pantothenic acid (B5), Vitamin B6, Folic acid, Folate, Vitamin B12, Biotin and Vitamin C).

The dry blending process was carried out in a Paddle Blender (ex Dinnissen). The top hatch was opened and the powders were added. The high fat base powder was split into two portions. One of the portions was the first powder added to the blender, then the rest of ingredients (amino acid premix, minerals & vitamin premix and glucose syrup DE 21) and then the blender was topped off with the other half of high fat base powder. The mixture is blended for 60 sec at 50 Hz. The blended powder is then discharged into a hopper and collected. A sieving step can be incorporated to the process, but if the product is for human consumption, this step is a critical control point, e.g. the product goes through a magnetic sieve in order to remove any large lumps or foreign objects. The sieving has a mesh size of 1.5 mm.

The resulting powder is suitable protein-free infant formula for preventing, reducing and treating allergy or in preventing, reducing and treating metabolic disorders, in particular for the dietary management of cow's milk allergy.

Example 4: Evaluation of Nutritional Powder Compositions

Methodology 62 panellists (20 from the UK and 42 from the NL) participated in a taste evaluation using a 'Rate All That Apply' (RATA) test. The panellists were asked to rate the intensity of each attribute: "low", "medium" or "high" (or indicate "not applicable"). The following compositions were subjected to the taste evaluation.

| | Composition (kg/100 kg powder) | | |
|---|---|---|---|
| Ingredient | Control | Based on 42% fat base powder | Based on 50% fat base powder |
| Glucose syrup 21 DE (dried) | NA | 13.69 | 23.00 |
| Amino acid premix | 25.25 | 25.25 | 25.25 |
| Citrem 34% fat | 71.87 | NA | NA |
| OSA Starch 42% fat | NA | 58.18 | NA |
| OSA Starch 50% fat | NA | NA | 48.88 |
| DHA Encapsulate | 1.447 | 1.447 | 1.447 |
| ARA Encapsulate | 1.43 | 1.43 | 1.43 |

The final compositions contain the same amount of total fat. Control composition does not contain OSA starch as emulsifier, but Citrem (citric acid ester of mono- and diglycerides).

Powder Assessment

Compared to the control composition without OSA starch, the 42% fat and 50% fat recipes were significantly less lumpy, yellow and granular in appearance. Moreover, the 42% fat composition is significantly less lumpy compared to the 50% composition, as well as compared to the control composition (34% fat).

Liquid Assessment

Compared to the control (34% fat), the 42% and 50% fat compositions resulted in less coating on the sides of the cup, and were more milky in taste. In addition, the 42% fat composition demonstrated a reduced and undesired mouth coating feeling compared to the control. Compared to the control, the 50% fat composition was described as possessing a smell akin to cooked vegetables. Compared to the 50% fat recipe, the 42% fat composition demonstrated less of a perceived cardboard and cooked vegetable smell.

Both the 42% and 50% fat compositions were significantly different compared to the control composition. Between the two high fat compositions, the 42% fat one was selected as the most promising in terms of sensory properties as it showed a less cardboard and cooked vegetable smell than the 50% fat composition.

The invention claimed is:

1. A method for producing a nutritional powder, comprising fat, an emulsifier, digestible carbohydrates, and proteinaceous material comprising the steps of
   a. preparing a liquid containing the digestible carbohydrate and the emulsifier in water by adding the digestible carbohydrate and the emulsifier consecutively or simultaneously to water at a temperature of between 50 and 90 deg C., optionally using a homogenization step;
   b. providing a fat ingredient containing at least one fat;
   c. combining the liquid and the fat ingredient to provide a pre-emulsion;
   d. performing a homogenization step to homogenize the pre-emulsion to form an emulsion, and optionally increasing the dry matter content of the emulsion by a concentration step;
   e. spray drying the emulsion obtained in step d to provide a base powder;
   f. optionally further drying the base powder of step e;
   wherein the emulsifier is octenylsuccinyl anhydride substituted starch (OSA starch),
   wherein the fat content of the base powder is at least 32 wt % on total dry weight of the base powder, wherein the free fat content is less than 3 wt % based on total weight of the fat, g. adding one or more dry ingredients by dry blending, to obtain the nutritional powder, wherein the nutritional powder is an infant formula, follow-on formula or growing-up milk, wherein the nutritional powder comprises 40-60 wt. % of the base powder, wherein the nutritional powder contains 95-100 wt. % amino acids based on total proteinaceous material.

2. The method of claim 1, wherein the fat content of the base powder is 35 to 70 wt % on total dry weight of the base powder.

3. The method according to claim 2, wherein the fat content of the base powder is 40 to 60 wt % on total dry weight of the base powder.

4. The method of claim 1, wherein the pre-emulsion additionally contains at least one further component.

5. The method according to claim 4, wherein the at least one further component is a vitamin, mineral or protein.

6. The method according to claim 1, wherein the OSA starch is derived from waxy maize starch, tapioca starch, rice starch, potato starch, wheat starch, starch from other plant origin substituted with octenylsuccinic acid groups.

7. The method according to claim 1, wherein the further dry ingredients of step (g) contain at least one of a digestible carbohydrate, a digestible protein, a hydrolysed protein, a peptide, an amino acid, a biotic, a non-digestible carbohydrate or fibre, a vitamin, mineral or a mixture of two or more of these.

8. The method according to claim 1, wherein the weight ratio of the digestible carbohydrate to the emulsifier in the liquid composition of step (a) is in the range of 15/1-1/3.

9. The method according to claim 8, wherein the weight ratio of the digestible carbohydrate to the emulsifier in the liquid composition of step (a) is in the range of 10/1 to 1/1.

10. The method according to claim 9, wherein the weight ratio of the digestible carbohydrate to the emulsifier in the liquid composition of step (a) is in the range of 6/1 to 4/1.

11. The method according to claim 1, wherein the nutritional powder further comprises dietary fibres which are added during the dry-blending of step (g).

12. The method according to claim 1, wherein the amino acids are added to the pre-emulsion or the emulsion prior to step (e) or the amino acids are blended with the base powder in step (g).

13. A nutritional powder comprising
40-60 wt % of base powder, wherein the base powder comprises fat, digestible carbohydrates and emulsifier, wherein the fat content is at least 32 wt % based on total dry weight of the base powder, the free fat content is less than 3 wt % based on total weight of the fat, and the emulsifier is OSA starch; and one or more ingredients selected from the group consisting of a digestible carbohydrate, a protein, hydrolysed protein, peptide, amino acid, a non-digestible carbohydrate, biotic, vitamin and mineral, wherein the nutritional powder is an infant formula, follow-on formula or growing-up milk, wherein the nutritional powder comprises fat, an emulsifier, digestible carbohydrates, and proteinaceous material and contains 95-100 wt. % free amino acids based on total proteinaceous material.

14. The nutritional powder according to claim 13, wherein the powder is obtainable by a method for producing a nutritional powder, comprising fat, an emulsifier, digestible carbohydrates, and proteinaceous material, comprising the steps of a. preparing a liquid containing the digestible carbohydrate and the emulsifier in water by adding the digestible carbohydrate and the emulsifier consecutively or simultaneously to water at a temperature of between 50 and 90 deg C., optionally using a homogenization step;

b. providing a fat ingredient containing at least one fat;

c. combining the liquid and the fat ingredient to provide a pre-emulsion;

d. performing a homogenization step to homogenize the pre-emulsion to form an emulsion, and optionally increasing the dry matter content of the emulsion by a concentration step;

e. spray drying the emulsion obtained in step d to provide a base powder;

f. optionally further drying the base powder of step e;

wherein the emulsifier is octenylsuccinyl anhydride substituted starch (OSA starch), wherein the fat content of the base powder is at least 32 wt % on total dry weight of the base powder, wherein the free fat content is less than 3 wt % based on total weight of the fat, g. adding one or more dry ingredients by dry blending, to obtain the nutritional powder, wherein the nutritional powder is an infant formula, follow-on formula or growing-up milk, wherein the nutritional powder comprises 40-60 wt. % of the base powder, wherein the nutritional powder contains 95-100 wt. % amino acids based on total proteinaceous material.

15. A method for preventing, reducing and treating allergy or in preventing, reducing and treating metabolic disorders in a subject, comprising administering the composition according to claim 13 to the subject.

* * * * *